United States Patent
Chapman

[15] 3,695,517
[45] Oct. 3, 1972

[54] APPARATUS FOR CONTROLLING A FLOW OF A PRESSURE FLUID

[72] Inventor: Thomas Henry Chapman, Sanderstead, England

[73] Assignee: Gunson's Sortex Limited, London, England

[22] Filed: Jan. 11, 1971

[21] Appl. No.: 105,566

[30] Foreign Application Priority Data

Feb. 11, 1970  Great Britain............6,550/70

[52] U.S. Cl. ................239/583, 239/585, 239/597
[51] Int. Cl. .............................................B05b 1/30
[58] Field of Search......239/583, 584, 585, 586, 572, 239/597, 592

[56] References Cited

UNITED STATES PATENTS

| | | | |
|---|---|---|---|
| 2,910,249 | 10/1959 | Gunkel | 239/585 X |
| 1,699,210 | 1/1929 | Robertshaw | 239/521 X |
| 3,009,529 | 11/1961 | Brown | 239/597 X |
| 3,053,463 | 9/1962 | Milleville | 239/585 X |
| 3,339,849 | 9/1967 | Paulus | 239/585 X |
| 3,229,912 | 1/1966 | Waldrum | 239/583 X |
| 3,498,546 | 3/1970 | Logan et al. | 239/583 |
| 1,085,293 | 1/1914 | Pape | 239/597 |

*Primary Examiner*—M. Henson Wood, Jr.
*Assistant Examiner*—John J. Love
*Attorney*—Cushman, Darby & Cushman

[57] ABSTRACT

The invention concerns apparatus for controlling a flow of pressure fluid, the apparatus comprising a chamber having an inlet and an outlet through which the pressure fluid may respectively be supplied to and may issue from the interior of the chamber, a valve member which is movable between open and closed positions in which a flow of pressure fluid from the interior of the chamber to the outlet is respectively permitted and prevented, the valve member having first and second oppositely disposed pressure surfaces which, in the said closed position, are respectively subjected to the pressures prevailing in the interior of the chamber and in the outlet, whereby the valve member is pressure urged towards the closed position, and means for respectively moving the valve member into the open position, the outlet having at least one vent therein to reduce the pressure acting on the said second pressure surface, whereby to assist closing movement of the valve member, a portion only of the fluid in the outlet passing to said vent.

8 Claims, 6 Drawing Figures

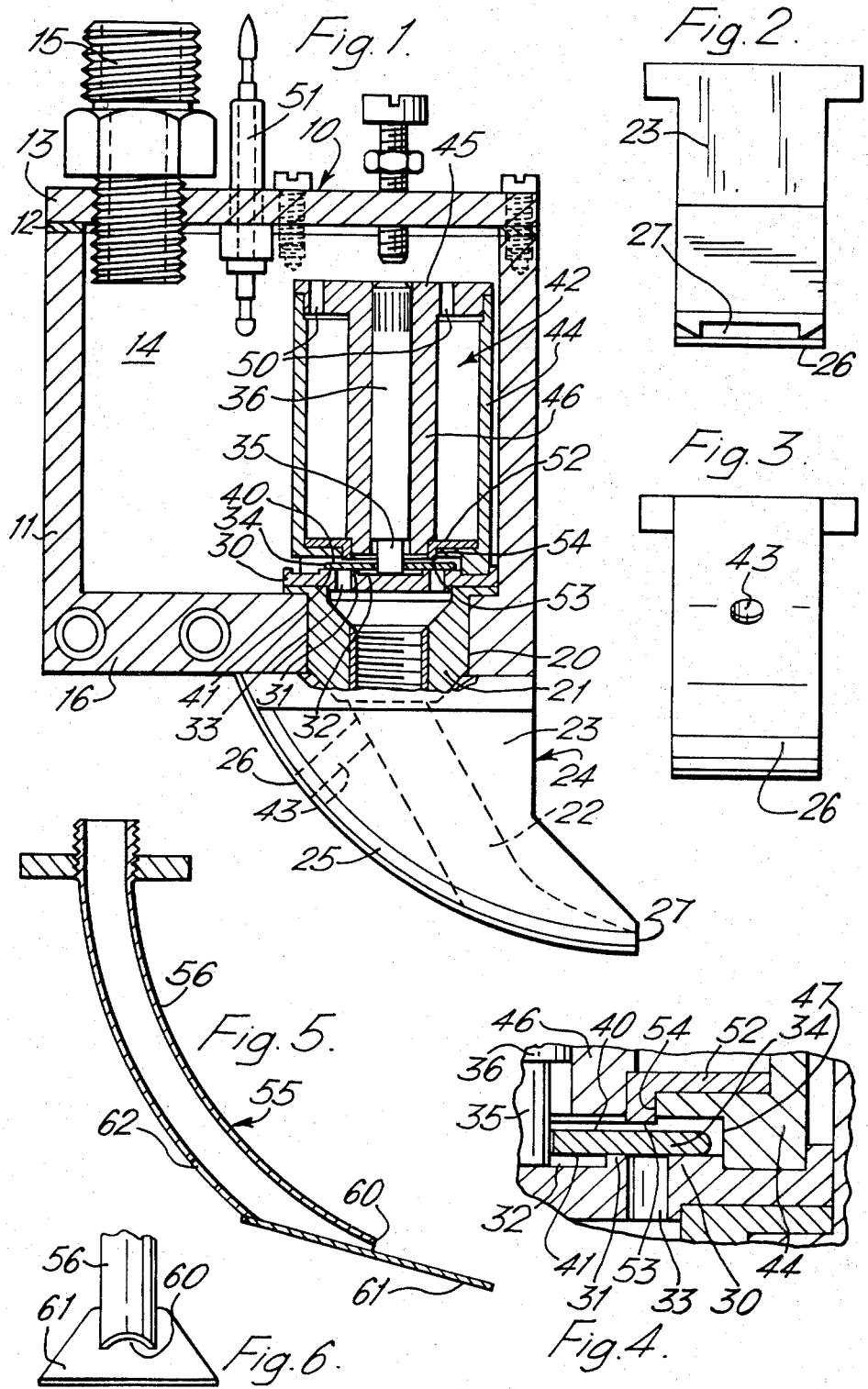

APPARATUS FOR CONTROLLING A FLOW OF A PRESSURE FLUID

This invention concerns an apparatus for controlling a flow of a pressure fluid, and, although the invention is not so restricted, it is more particularly concerned with an ejector device of a sorting machine, the ejector device being adapted to direct compressed air at predetermined material being sorted.

According to the present invention there is provided an apparatus for controlling a flow of pressure fluid, the apparatus comprising a chamber having walls provided with an inlet and an outlet through which the pressure fluid may respectively be supplied to and may issue from the interior of the chamber, an elongated outlet duct disposed externally of said chamber walls, one end of the outlet duct communicating with the said outlet and the other end thereof with the atmosphere, a valve member which is movable between open and closed positions in which a flow of pressure fluid from the interior of the chamber to the outlet and the outlet duct is respectively permitted and prevented, the valve member having first and second oppositely disposed pressure surfaces which, in the said closed position, are respectively subjected to the pressures prevailing in the interior of the chamber and in the outlet duct, whereby the valve member is pressure urged towards the closed position, and means for respectively moving the valve member into the open position, the outlet duct having at least one vent therein intermediate of the ends thereof to reduce the pressure acting on the said second pressure surface, whereby to assist closing movement of the valve member the axis of said vent being inclined to that of the outlet duct to ensure that, at most, a minor portion only of the fluid in the outlet duct passes to said vent.

The outlet duct preferably forms part of a nozzle through which a jet of the pressure fluid may issue.

The nozzle may have means which cause the jet to issue as a sheet of fluid.

The sheet of fluid is preferably fan-shaped.

The nozzle may be provided with an elongated outlet slot.

The nozzle may comprise a blocks, the said outlet duct extending therethrough to an outer surface of the block, the outer surface being covered by a sheet metal member which deflects the jet towards the elongated outlet slot, the latter being defined by the block and sheet metal member.

Alternatively the outlet duct may comprise a tube whose said other end is disposed adjacent to a deflector member which, in operation, causes the fluid issuing from the said other end to form the said sheet of fluid. In this case the said tube may have a vent hole therein.

The valve member is preferably annular and is mounted about and freely movable over a cylindrical member.

The valve member is preferably of magnetic material, the means for moving the valve member to the open position comprising a solenoid device.

The solenoid device may have a portion of non-magnetic material which is the only portion of the solenoid device engaged by the valve member when the latter is in the said open position.

Preferably, only a minor portion of the valve member is engageable with the non-magnetic portion of the solenoid device, a major portion of the valve member, when the latter is in the said open position, being disposed adjacent to but spaced by an air gap from a magnetic portion of the solenoid device. Thus the non-magnetic portion of the solenoid device may comprise a flanged member whose flange stands proud of the magnetic portion of the solenoid device and is engageable by the valve member.

The valve member is preferably made of spring steel, and is preferably a valve disc.

The non-magnetic portion of the solenoid device may be made of stainless steel.

As indicated above, the apparatus of the present invention is preferably constituted by an ejector device of a sorting machine, the ejector device being adapted to direct compressed air at predetermined material being sorted.

The invention is illustrated, merely by way of example, in the accompanying drawings in which:

FIG. 1 is a sectional view of an apparatus in accordance with the present invention, FIGS. 2 and 3 are respectively front and rear elevations of a part of the apparatus of FIG. 1, FIG. 4 is a broken away view illustrating a detail of FIG. 1 on a larger scale, FIG. 5 is a sectional view of a modification, and FIG. 6 is a broken away elevation of part of the structure shown in Figure 5.

Terms such as "top" and "bottom" as used in the description below, are to be understood to refer to directions as seen in the drawings.

Referring to FIGS. 1 to 4 of the drawings, an ejector device of a sorting machine comprises a chamber 10 whose walls comprise a cup-shaped housing member 11 which is sealed by a sealing plate 12 to a cover plate 13. The interior 14 of the chamber 10 may be supplied with compressed air through an inlet constituted by coupling 15 which may be connected to a compressed air line (not shown).

The housing member 11 has a base wall 16 having an aperture 20 within which is mounted a nozzle 21 which forms part of an outlet through which the compressed air may issue as a jet from the interior 14 of the chamber 10.

The nozzle 21 directs the jet of compressed air into one end of an elongated outlet duct 22 which is disposed externally of the walls of the chamber 10 and extends through a block 23 forming part of a nozzle 24. The duct 22 extends to an outer surface 25 of the block 23, the outer surface 25 being covered by a sheet metal member 26. The sheet metal member 26, which defines an elongated outlet slot 27 with the block 23, smoothly deflects the jet towards the slot 27, and thus to the atmosphere the latter causing the jet to issue as a fan-shaped sheet of air. This helps to ensure that the sheet of air may be directed primarily at undesired material which is to be removed from a stream of material being sorted, without simultaneously removing excessive amounts of desired material therefrom.

Mounted on the nozzle 21 is a valve seat member 30 having an annular land 31 and a recessed portion 32 which is disposed radially inwardly of the land 31, the land 31 having valve ports 33 therein. An annular spring steel, valve disc 34, which is thus of magnetic material, cooperates with the valve seat member 30 and is movable, between open and closed positions in which a flow of compressed air from the interior 14 and through the valve ports 33 is respectively permitted and prevented.

The disc 34 is mounted about and is freely movable over a reduced diameter portion 35 of a hollow cylindrical guide member 36. The disc 34 extends over the recessed portion 32, the latter being spaced by a small gap (not shown) from the portion 35. The cylindrical guide member 36 is thus open to receive a flow of compressed air therethrough from the interior 14, the arrangement being such that, when the disc 34 is in the open position (not shown), there are two separate flows of compressed air passing to the valve ports 33. One of these flows of air passes from the interior 14 to the top of the cylindrical guide member 36 and then passes from the bottom of the latter to the recessed portion 32, and so over the land 31 to the valve ports 33. The other flow of air passes directly from the interior 14 to flow over the valve seat member 30 and beneath the disc 34, so as to pass to the valve ports 33. The flow of air through the cylindrical guide member 36 considerably augments the volume of air which would otherwise pass out through the valve ports 33 once the disc 34 moves to the open position, and is of substantial practical importance.

The disc 34 has oppositely disposed pressure surfaces 40, 41 which, when the disc 34 is in the closed position shown, are respectively subjected to the pressures prevailing in the interior 14 of the chamber 10 and in the nozzles 21, 24. Accordingly, the disc 34 is pressure urged towards the closed position, a solenoid device 42 being mounted within the chamber 10, which solenoid device, when energized, causes the disc 34 to move over the portion 35 and into the open position.

In order to reduce the pressure acting on the pressure surface 41, and so increase the pressure differential across the disc 34 acting in a direction to assist closing movement thereof, the nozzle 24 has at least one vent passage 43 therein. The vent passage or passages 43, through which pass at most a minor portion only of the compressed air in the nozzle 24, communicate with the duct 22 intermediate of the ends thereof the axis of the or each said vent passage 43 being inclined to that of the outlet duct.

As will be appreciated, the provision of the vent passage or passages 43 not only assists closing of the disc 34, but also reduces the pressure of the jet issuing from the slot 27. This is desirable since a high pressure must be used if the disc 34 is to move at the high speed required in practice, and this high pressure would be too high when the sorting being effected is that of small articles.

The solenoid device 42 comprises a cup-shaped member 44, the member 44 being closed by a cap 45 which is integral with a bobbin 46, all these parts being of a magnetic steel. As will be appreciated, the mounting of the disc 34 on the portion 35 ensures that the disc 34 is guided along a truly axial course and is thus prevented from radial movement which could otherwise damage an internal shoulder 47 of the cup-shaped member 44.

A solenoid winding (not shown) is wound about the bobbin 46 and housed within the cup-shaped member 44. The cap 45 is provided with apertures 50 through which the leads to the solenoid winding may be introduced, these leads extending through an insulated tubular member 51.

Mounted within the cup-shaped member 44 and in contact with the base thereof is a striking plate 52 having an annular flange 53. The flange 53 extends through an aperture 54 in the base of the cup-shaped member 44, the flange 53 (as shown in FIG. 4) standing proud of the cup-shaped member 44. The flange 53 is engageable by the disc 34, only a minor portion of the disc 34 engaging the flange 53.

The plate 52 and its flange 53 are made of stainless steel, and thus of relatively hard non-magnetic material whereas the cup-shaped member 44 is made of a relatively soft magnetic steel. Accordingly, the only portion of the solenoid device 42 which is engaged by the disc 34 when in the open position is a hard, non-magnetic portion thereof. Moreover, the major portion of the disc 34, when in the open position, is disposed adjacent to but spaced by an air gap from the magnetic portion of the solenoid device.

Thus the disc 34 may be swiftly moved by the air pressure into the closed position immediately the solenoid is de-energized, while the wear on the plate 52 is much smaller than the wear which would otherwise occur on the softer cup-shaped member 44, thus making for increased reliability of operation.

It has, indeed been found that the use of a spring steel disc 34 and a stainless steel striking plate 52 ensures that the parts suffer the minimum of wear and distortion in service.

FIGS. 5 and 6 illustrate a modification in which the nozzle 24 is replaced by a nozzle device 55. The latter comprises an elongated tube 56 whose upper end is arranged to receive compressed air which has passed through the nozzle 21. The tube 56 has a lower, or outlet, end 60 which is disposed adjacent to a curved deflector plate 61. As will be seen from FIG. 6, an issuing from the relatively narrow outlet end 60 spreads over the relatively broad deflector plate 61 to form a thin, fan-shaped, sheet of air.

The tube 56 has a vent hole 62 adjacent its outlet end 60, the vent hole 62 performing the same function as the vent passage 43.

I claim:

1. Apparatus for controlling a flow of a pressure fluid, the apparatus comprising a chamber having walls provided with an inlet and an outlet through which the pressure fluid may respectively be supplied to and may issue from the interior of the chamber, an elongated outlet duct disposed externally of said chamber walls, one end of the outlet duct communicating with the said outlet and the other end thereof with the atmosphere, a valve member which is movable between open and closed positions in which a flow of pressure fluid from the interior of the chamber to the outlet and the outlet duct is respectively permitted and prevented, the valve member having first and second oppositely disposed pressure surfaces which, in the said closed position, are respectively subjected to the pressures prevailing in the interior of the chamber and in the outlet duct, whereby the valve member is pressure urged towards the closed position, and means for respectively moving the valve member into the open position, the outlet duct having at least one vent therein intermediate of the ends thereof to reduce the pressure acting on the said second pressure surface, whereby to assist closing movement of the valve member the axis of said vent being inclined to that of the outlet duct to ensure that, at most, a minor portion only of the fluid in the outlet duct passes to said vent.

2. Apparatus as claimed in claim 1 in which the outlet duct forms part of a nozzle through which a jet of the pressure fluid may issue.

3. Apparatus as claimed in claim 2 in which the nozzle has means which causes the jet to issue as a sheet of fluid.

4. Apparatus as claimed in claim 3 in which the sheet of fluid is fan-shaped.

5. Apparatus as claimed in claim 3 in which the nozzle is provided with an elongated outlet slot.

6. Apparatus as claimed in claim 5 in which the nozzle comprises a block, the said outlet duct extending therethrough to an outer surface of the block, the outer surface being covered by a sheet metal member which deflects the jet towards the elongated outlet slot, the latter being defined by the block and sheet metal member.

7. Apparatus as claimed in claim 3 in which the outlet duct comprises a tube whose said other end is disposed adjacent to a deflector member which, in operation, causes the fluid issuing from the said other end to form the said sheet of fluid.

8. Apparatus as claimed in claim 7 in which the said tube has a vent hole therein.

* * * * *